United States Patent [19]
Truong

[11] Patent Number: 5,898,835
[45] Date of Patent: Apr. 27, 1999

[54] SYSTEM AND METHOD FOR REMOTELY EXECUTING A COMMAND

[75] Inventor: Timothy M. Truong, Plano, Tex.

[73] Assignee: Electronic Data Systems Corporation, Plano, Tex.

[21] Appl. No.: 08/698,614

[22] Filed: Aug. 16, 1996

[51] Int. Cl.[6] .................................................. G06F 13/14
[52] U.S. Cl. .............................. 395/200.47; 395/200.33; 395/200.49; 395/200.57; 395/200.59
[58] Field of Search ............................... 395/200.36, 186, 395/187.01, 188.01, 200.3–200.33, 200.46–200.49, 200.55–200.59

[56] References Cited

U.S. PATENT DOCUMENTS

| 5,455,953 | 10/1995 | Russell | 395/739 |
| 5,530,852 | 6/1996 | Meske, Jr. et al. | 395/200.36 |
| 5,572,643 | 11/1996 | Judson | 395/200.48 |
| 5,611,048 | 3/1997 | Jacobs et al. | 395/188.01 |
| 5,636,371 | 6/1997 | Yu | 395/200.57 |
| 5,655,081 | 8/1997 | Bonnell et al. | 395/200.32 |
| 5,675,800 | 10/1997 | Fisher, Jr. et al. | 1/1 |
| 5,708,832 | 1/1998 | Inniss et al. | 395/200.59 |
| 5,732,219 | 3/1998 | Blumer et al. | 395/200.57 |
| 5,771,354 | 6/1998 | Crawford | 395/200.59 |

Primary Examiner—Krisna Lim
Assistant Examiner—Bharat Barot
Attorney, Agent, or Firm—Alexander B. Ching; L. Joy Griebenow

[57] ABSTRACT

A remote command execution system (26) is provided for remotely executing commands at a computer. The remote command execution system (26) includes a client (12) using a web browser (32) and a remote Internet server (15) having a mass storage device (44), for storing computer files, and a processor (42). The processor (42) is responsive to one or more of the computer files of the mass storage device (44). The processor (42) is responsive to communicate a command input form to the web browser (32) of the client (12) and to receive an input from the client (12) that includes a command to be executed by the remote Internet server (15). The processor (42) is further responsive to process the input, execute the command, and generate an output including the results of executing the command. The remote Internet server (15) then provides the output to the web browser (32) of the client (12) for displaying.

17 Claims, 4 Drawing Sheets

SYSTEM AND METHOD FOR REMOTELY EXECUTING A COMMAND

NOTICE

"Copyright 1996 Electronic Data Systems Corporation." A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD OF THE INVENTION

This invention relates generally to the field of computers and more particularly to a system and method for remotely executing a command.

BACKGROUND OF THE INVENTION

Internet growth and use continues to rapidly accelerate as the Internet grows in importance throughout the world. The Internet allows businesses, groups, and individuals to communicate and conduct business electronically. Communication takes place over the Internet in a variety of different ways. For example, businesses and individuals are establishing web pages and home pages that contain a variety of information and are accessible to other Internet users ("users") throughout the world. Users may also communicate with one another through the exchange of files, such as electronic mail ("e-mail") files, and through participation in discussion groups on any number of available topics.

The Internet, which is also referred to as the World Wide Web, is an interconnection of computer servers ("servers") located throughout the world. Internet servers may exchange information or web pages with one another using a protocol known as hypertext transport protocol ("HTTP"). Web pages are stored on the Internet servers and may be communicated to any other server using HTTP. Users may access the Internet from virtually anywhere in the world by interconnecting with one of the Internet servers using a client, such as a personal computer. A user accesses a web page by entering a uniform resource locator ("URL") which identifies a particular web page stored on an Internet server. The term "web page" is used herein to mean any computer file capable of being provided through a computer network to a client, processed, and then displayed. The web page is then communicated from the Internet server, where it is stored, to the server where the client is connected. The web page is then communicated to the client. In this manner, information can be easily disseminated throughout the world. Each web page on the World Wide Web has its own unique URL.

Generally, a user accesses the Internet by executing a "web browser" or "parser" program locally at the client and interconnecting to the server of an Internet service provider. The interconnection may use any of a variety of communication links such as a local telephone communication link or a dedicated communication link. The web browser is a computer program that allows the client to exchange information with the Internet. Any of a variety of web browsers are available, such as NETSCAPE NAVIGATOR, MICROSOFT EXPLORER, NCSA MOSAIC, and others that allow users to conveniently access and navigate the Internet using a graphical user interface. Web browsers receive web pages in a format or language understandable by a web browser, such as Hypertext Markup Language ("HTML"). Web browsers interpret the web pages and generate a corresponding display of the web pages using a graphical user interface.

Some web pages include on-screen forms, including fill-in text boxes, option buttons, radio buttons, and drop-down list boxes that allow a user to interact with a web page. The information provided in these forms may be used as input to a program executing at the server where the web page is stored so that an output web page may be generated in response. NETSCAPE NAVIGATOR, MICROSOFT EXPLORER, and NCSA MOSAIC are known as "forms-capable browsers" because they can interpret HTML code which provides these forms.

Still other web browsers are script-enabled browsers, such as JAVASCRIPT-enabled browsers, and are capable of interpreting HTML web pages that include embedded script within the HTML code. The embedded-script code is interpreted by a script-enabled browser at the client for enhanced processing capability.

Web page designers are able to use the HTML language and scripting languages such as JAVASCRIPT to create web pages or home pages that may be displayed at a client running a web browser. Each web page is assigned a unique address or URL so that users of the Internet may access a desired web page by entering its URL. Many web pages also provide various graphical icons that, if selected, will automatically access another web page. While other web pages include graphical icons that, if selected, will execute a program at a server that generates an output as a web page in HTML format. This output can then be displayed like any other web page. In this manner, users may conveniently navigate the Internet by simply using their mouse and "clicking" on a graphical icon or a link that will automatically take them to a desired web page.

The popularity of the Internet and computers in general has increased the demand for personnel trained in the computer sciences to serve as system administrators. System administrators are responsible for the operation of multiuser computer systems, such as Internet servers. A system administrator of an Internet server is sometimes referred to as a Webmaster.

System administrators perform such duties as assigning user accounts and passwords, establishing security access levels, and allocating storage space, as well as being responsible for other tasks such as watching for unauthorized access and preventing virus programs from entering the system. System administrators are also in charge of correcting and recovering from any system failures, such as mass storage failures and memory failures, and returning the system back to normal operation.

With society's increased reliance on computers and the Internet, system administrators must be available around the clock to correct any system problems and return the system to normal as quickly as possible in the event of system problems or failure. Often, system problems may be detected before a system crashes. If a system administrator is made aware of these problems, corrective action can often be taken to avoid a catastrophic system crash.

The around-the-clock operation of an Internet server is especially critical to businesses that conduct business over the Internet with customers throughout the world. Substantial dollars may be lost if a business's web pages are not available around-the-clock so that customers throughout the world cannot conveniently order a product or retrieve needed information. Problems arise when system administrators go on vacation or are not physically located at the site of the server. System administrators have attempted to solve this problem by using communication programs, such as PROCOMM PLUS by DATASTORM TECHNOLOGIES, INC., and a personal computer with a modem so that the system administrator may directly connect to the Internet server from a remote location and perform any needed server maintenance or repair.

This solution has proven troublesome for several reasons. First, the specialized communication software may not be available to the system administrator at all times, such as when the system administrator is on vacation or when the system administrator's personal computer or notebook computer fails. Second, it is often still necessary to set up and initialize communication software at the server and ensure that the communication software and modem is operational to receive incoming calls. This still requires the physical presence of personnel at the server at a time when personnel may be unavailable. Additionally, remote access using a communication program often involves using a telephone system where expensive long distance telephone fees are incurred. These problems may prevent a system administrator, physically located away from the server, from performing critical operations that are needed to keep the server up and running.

SUMMARY OF THE INVENTION

From the foregoing it may be appreciated that a need has arisen for a remote command execution system that allows a system administrator to execute server commands, such as server operating system commands, using virtually any client in the world running a web browser and connected to the Internet. In accordance with the present invention, a remote command execution system is provided that allows a system administrator to execute server commands from a remote location by accessing a particular web page, entering a security code, and entering the desired command. This eliminates the need to use dedicated communication software to access the server through a telephone communication link and a dedicated modem. The term "remote location," as used herein, may include any physical distance from a few feet to many thousands of miles and may be a distance across the world, across town, or even across a room.

According to an embodiment of the present invention, there is provided a remote command execution system using a computer coupled to a network that includes a storage medium for storing computer files and a processor responsive to one or more of the computer files of the storage medium. The processor is responsive to communicate a command input form to a client of the network that prompts a user of the client to enter a command to be executed by the remote command execution system. The processor receives the command as an input, processes the input, executes the command, and communicates the results of executing the command to the client as an output.

A technical advantage of the present invention includes the ability to remotely execute server operating system commands using any computer having a web browser and connected to the Internet. As the popularity of the Internet increases, Internet connections through a client using a web browser are becoming common place and are frequently found in such places as hotels, libraries, airports, kiosks, and retail stores. This allows a system administrator to perform system administrator duties from virtually anywhere in the world without having to have specialized or dedicated communication software available. Moreover the present invention includes the elimination of costly long distance telephone fees incurred when system administrators must access a system remotely through a long distance telephone connection.

Another technical advantage of the present invention includes the elimination of costly modems dedicated to remote access. The present invention also eliminates the requirement that personnel be physically available at the server to initialize communications software and hardware so that remote communication may take place. The present invention may also reduce overall personnel costs due to the ability of one system administrator to provide system administration services to servers physically located in different areas. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

Turning first to the nomenclature of the specification, the detailed description which follows is represented largely in terms of processes and symbolic representations of operations by conventional computer components, including a central processing unit ("CPU") or processor associated with a general purpose computer system, memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process or method is generally considered to be a sequence of computer-executed steps leading to a desired result. These steps generally require manipulations of physical quantities. Usually, although not necessarily, these quantities take the form of electrical, magnetic, or optical signals capable of being stored, transferred, combined, compared or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc., which are often associated with manual operations performed by a human operator. It must be understood that no involvement of a human operator is necessary or even desirable in the present invention. The operations described herein are machine operations performed in conjunction with a human operator or user that interacts with the computer or computers.

In addition, it should be understood that the programs, processes, methods, etc. described herein are but an example of one implementation of the present invention and are not related or limited to any particular computer, apparatus or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hard-wired logic or programs stored in non-volatile memory, such as read only memory.

Figure 1:
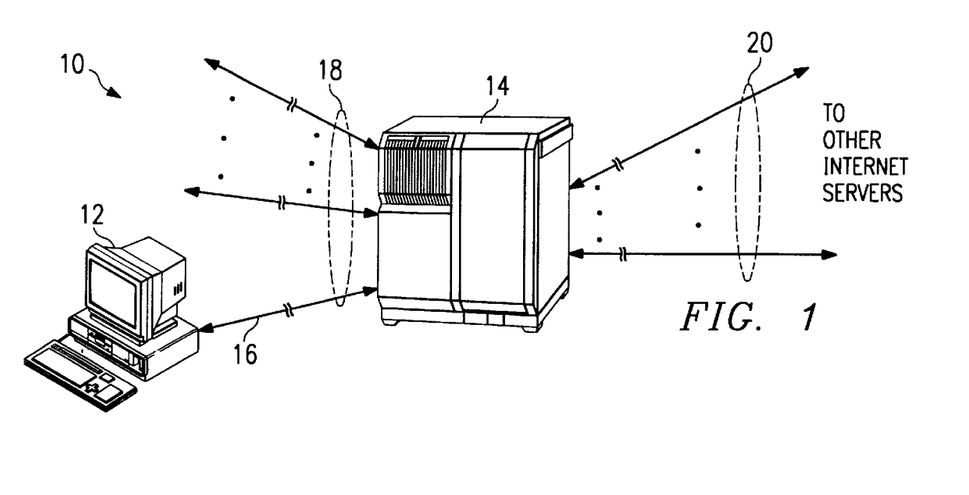
FIG. 1 is a diagram illustrating a network interconnection including a client and an Internet server.

Referring now in more detail to the drawings, FIG. 1 is a diagram illustrating a network interconnection 10 including a client 12 and an Internet server 14. Network interconnection 10 includes the interface between Internet server 14 and a plurality of clients through a plurality of direct communication lines 18. For example, network interconnection 10 includes an interconnection between client 12 and Internet server 14 through a direct communication line 16. Network interconnection 10 also includes the interface between Internet server 14 and other Internet servers through a plurality of communication lines 20. In this manner, Internet server 14 allows the plurality of clients directly interconnected with server 14, such as client 12, to communicate with other Internet users by providing an interconnection to other Internet servers through communication lines 20. The other Internet users are also directly interconnected with a server such that a communication path may be established between one client and another client through the various servers of the Internet.

Internet server 14 is a computer such as a personal computer, file server, workstation, minicomputer, mainframe, or any other computer capable of communicating and interconnecting with other computers. Internet server 14 will preferably include a processor, a printer, an input device such as a mouse and/or a keyboard, a monitor, a floppy disk drive, memory, a modem, and a mass storage device such as a hard disk drive. Communication lines 20 and direct communication lines 18 may be any type of communication link capable of supporting data transfer. For example, these communication lines may include any combination of an Integrated Services Digital Network ("ISDN") communication line, a hard wired line, or a telephone link.

Client 12 may be similar to Internet server 14 and may be implemented using virtually any type of computer. Client 12 will preferably be a personal computer having a processor, a printer, an input device such as a mouse and/or a keyboard, a monitor, a floppy disk drive, memory, a modem, and a mass storage device such as a hard disk drive. Client 12 and Internet server 14 will be operating under the control of an operating system such as MS-DOS, Macintosh OS, WINDOWS NT, WINDOWS 95, OS/2, UNIX, XENIX, and the like. Client 12 and Internet server 14 may execute any number of available application programs such as a web browser.

In operation, the various clients of network interconnection 10, such as client 12, may communicate through server 14 with any other client connected to the Internet. For example, client 12, generally using a web browser application program, may couple to Internet server 14 and provide the address or URL of an Internet web page. The Internet web page will generally be stored on another Internet server located anywhere in the world. Internet server 14, through the plurality of communication lines 20, communicates with other Internet servers using HTTP and provides the URL to other Internet servers. Eventually, the receiving Internet server is found and in response, transmits the Internet web page back to Internet server 14 for viewing by client 12 using a web browser.

Although network interconnection 10 has been illustrated and described in FIG. 1 as being a node or interconnection on the Internet, network interconnection 10 may be any interconnection found on any computer network such as a local area network ("LAN"), a wide area network ("WAN"), an intranet, such as a corporate intranet, or any other communications and data exchange system created by connecting two or more computers. The present invention will be illustrated and described with an implementation using the Internet, however, it should be understood that the present invention is not limited to only implementations using the Internet.

Figure 2:
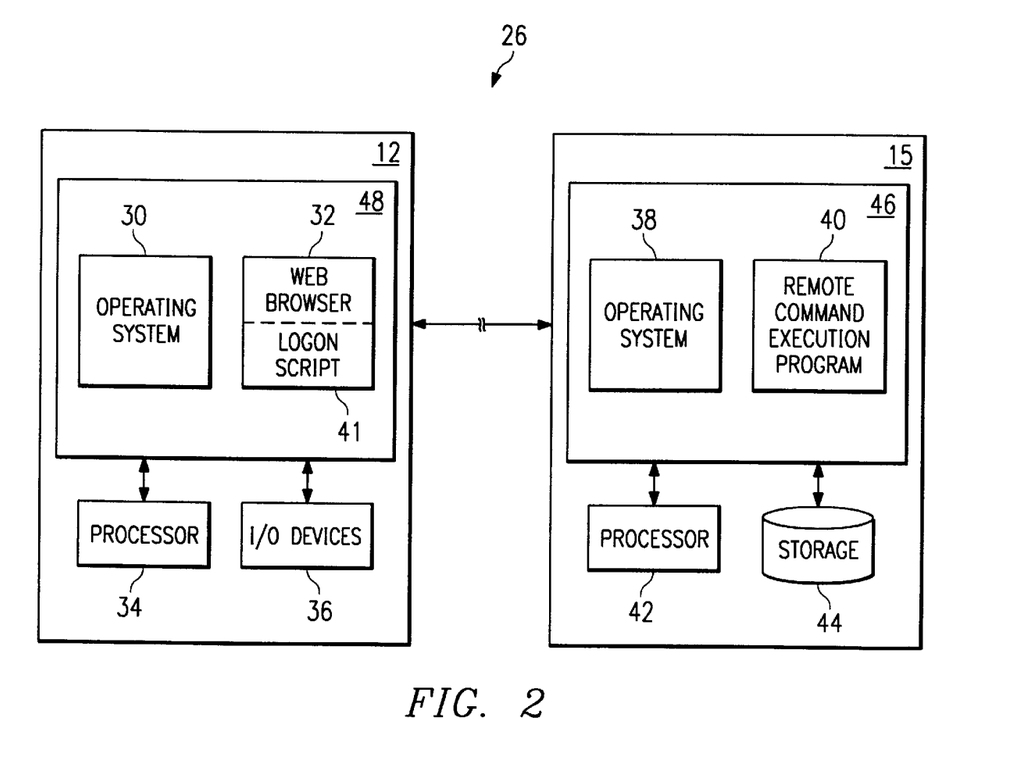
FIG. 2 is a block diagram illustrating the client and a remote Internet server configured as a remote command execution system.

FIG. 2 is a block diagram illustrating client 12 and a remote Internet server 15 configured as a remote command execution system 26. Client 12 includes a processor 34, input/output ("I/O") devices 36, and a client memory 48. Processor 34, under the control of an operating system 30, controls the operation of client 12 and is used to retrieve, process, store, and display data. Operating system 30 and a web browser 32 are stored in client memory 48. A logon script 41 may also be stored in client memory 48 and is provided as an embedded script from an Internet web page. Logon script 41 is discussed more fully below. Client memory 48 may be a random access memory ("RAM").

Processor 34 is typically implemented as a microprocessor, such as those manufactured by INTEL or MOTOROLA. Processor 34 may include an arithmetic logic unit to assist in performing mathematical operations. Processor 34 communicates control, address, and data signals with operating system 30 and with the remaining components of client 12 through a system bus. Processor 34 interprets and executes instructions that have been fetched or retrieved from client memory 48 and may be implemented as a single integrated circuit or as a combination of integrated circuits.

I/O devices 36 may include any peripheral that allows data to be exchanged with client 12 and may include such devices as a keyboard, a monitor, a printer, a modem, a pointing device, such as a mouse, a floppy disk drive, a mass storage device, such as a hard disk drive, and the like. The mass storage device is used to store computer files including application programs and data files. For example, the mass storage device may be used to store web browser 32 and operating system 30.

Operating system 30 includes a set of computer programs that control the internal functions of client 12, thereby allowing client 12 to run application programs. Operating system 30 is typically stored in and provided from a mass storage device, such as a hard disk drive, a floppy disk drive, a CD ROM drive or a ROM chip. During start-up or initialization of client 12, operating system 30 is loaded into client memory 48. Application programs, such as web browser 32, may also be loaded into client memory 48 along with operating system 30.

Web browser 32 is preferably a graphical web browser or parser that allows a user to view images, fonts, and document layouts provided in a web page by converting large units of data into smaller, more easily interpreted, units of data. Web browser 32 reads the tagged text of a web page, provided in HTML format. HTML uses tags to identify the parts of a web page, such as headings, bulleted lists, body text, on-screen forms, including fill-in text boxes, option buttons, radio buttons, and drop-down list boxes, images to be displayed, hypertext links, colors, font, and various other formatting tags. Web browser 32 formats the various parts of the document for on-screen display as directed by the HTML tags. Web browser 32 is known as a forms-capable browser because it is able to interpret HTML code which provides forms including fill-in text boxes, option buttons, drop-down list boxes, radio buttons, and the like.

Web browser 32 is also a script-enabled browser which enables it to interpret HTML formatted web pages that include embedded script within the HTML code. The embedded script is provided to web browser 32 at client 12 for enhanced processing at client 12. The embedded script may be provided in JAVASCRIPT format or any other scripting language format that is provided to a web browser at a client for enhanced processing.

Web browser 32 operates in conjunction with operating system 30 so that client 12 may properly interface with the Internet. Web browser 32 provides a graphical user interface and is accessed by operating system 30 at the request of a user. Once client 12 is coupled to Internet server 14 through direct communication line 16, as shown in FIG. 1, web pages may be accessed by entering the URL of the desired web page into web browser 32. It should be noted that web browser 32 is not a terminal emulation program or communication program that is used at client 12 to emulate a server terminal operating directly from remote Internet server 15.

Once a desired web page is retrieved, web browser 32 may receive formatting information and embedded script from a file defining the web page. The file defining a web page is generally located at a remote Internet server, such as remote Internet server 15 as shown in FIG. 2. Typically, web browser 32 receives the information in HTML format and the embedded script in JAVASCRIPT format so that the web page may be interpreted and processed using processor 34 and web browser 32 of client 12 and then graphically displayed at client 12. Often, a web page will contain user selectable icons that are preprogrammed with the URL of a related web page so that a user may conveniently navigate the Internet by selecting these icons.

Remote Internet server 15 includes a server memory 46, a processor 42, and a mass storage device 44. Although not shown in FIG. 2, remote Internet server 15 also preferably includes various I/O devices such as those mentioned above in the description of I/O devices 36 of client 12. Operating system 38 and remote command execution program 40 are stored in mass storage device 44 and are shown loaded into server memory 46.

Processor 42, in conjunction with operating system 38, controls the operation of remote Internet server 15. Processor 42 fetches and executes various instructions stored in server memory 46. Operating system 38 operates similarly to operating system 30 of client 12 and includes a set of computer programs that control the internal functions of remote Internet server 15. Operating system 38 controls the allocation and usage of hardware resources such as server memory 46, processor 42, mass storage device 44, and optional I/O devices (not specifically shown). Operating system 38 may be any of a variety of available operating systems depending partially on the hardware of server 14. For example, operating system 38 may be implemented as MS-DOS, the Macintosh OS, OS/2, WINDOWS NT, WINDOWS 95, UNIX, XENIX or any of a variety of other operating systems.

Remote command execution program 40 is an application program shown loaded into server memory 46. Remote command execution program 40 is stored in mass storage device 44 and is then loaded into server memory 46 when selected by a user. This may occur when a user of client 12, while accessing the Internet using web browser 32, requests a particular web page that will automatically load remote command execution program 40 into server memory 46. In response, HTML code and embedded script will be provided to web browser 32. For example, logon script 41, as shown in client memory 48 with web browser 32, may be provided to client 12 where it is processed using web browser 32 and processor 34.

Remote command execution program 40, discussed more fully below in connection with FIGS. 3, 4, and 5, communicates a command input form, including HTML code and embedded script code, to web browser 32 of client 12 which in turn preferably prompts the user for an input including a logon ID, a password, and an operating system command using a remote command execution web page shown in FIG. 5. The logon ID and the password may be referred to as security access codes. Appendix A provides sample code of one implementation of the command input form. These inputs identify a particular user and determine whether the user has rights to access remote command execution program 40 of remote Internet server 15. Logon script 41, provided by remote command execution program 40 through the command input form, is stored in client memory 48 and is interpreted by web browser 32 to determine whether text has been entered into the logon ID input and the password input. Assuming that text has been entered, the inputs are communicated back to remote command execution program 40 of remote Internet server 15. Remote command execution program 40 processes these inputs and executes the desired operating system command if the user provides a valid logon ID and password. The results of executing the operating system command at remote Internet server 15 are then provided as an output form, in HTML format, to web browser 32 of client 12. Web browser 32 interprets the HTML code and generates the results of the execution of the operating system command. The output form includes the command input form so that additional commands may be executed. In this manner, a system administer of remote Internet server 15 may execute operating system commands and perform system administrator duties while physically located away from remote Internet server 15.

Figure 3:
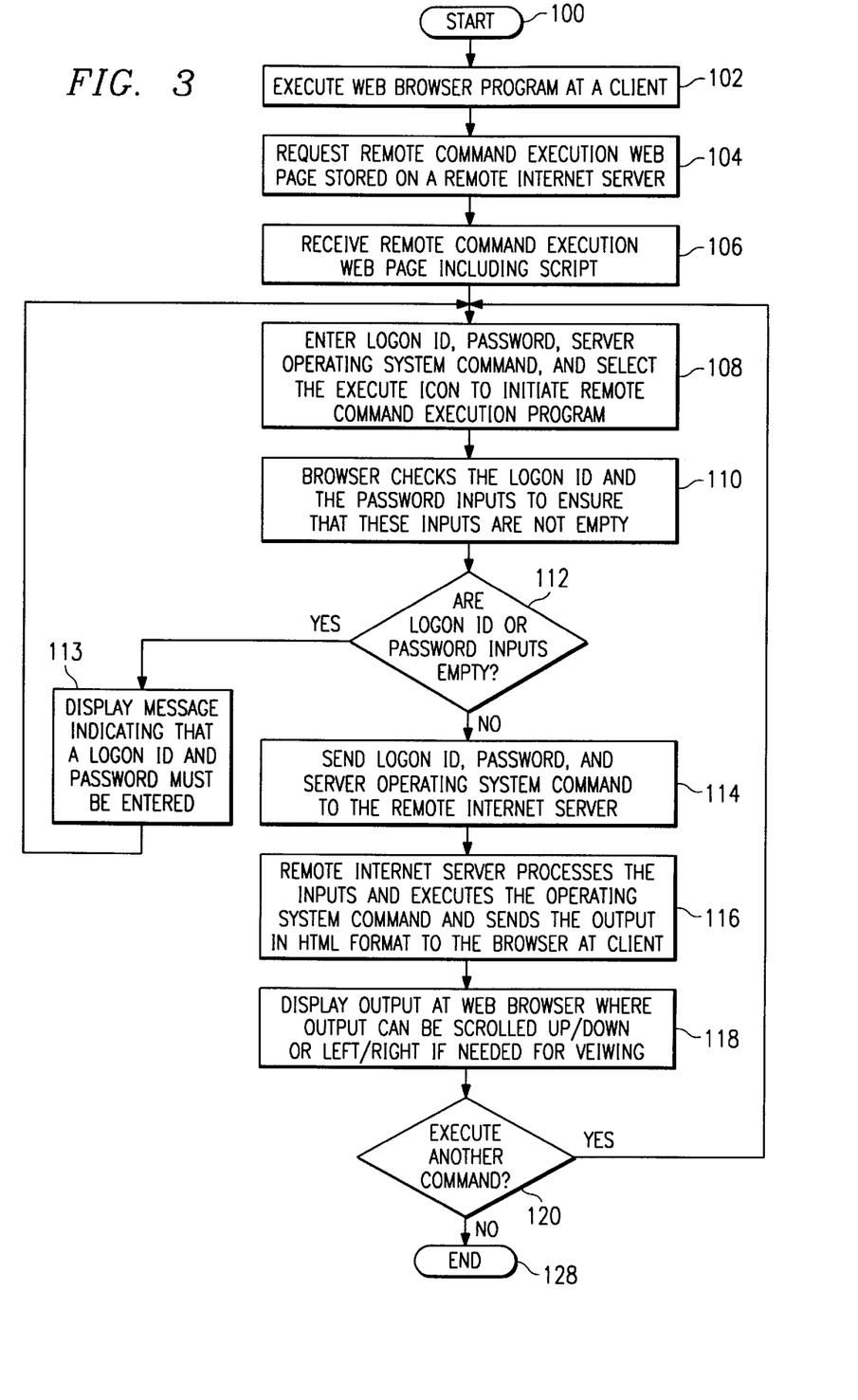
FIG. 3 is a flowchart illustrating an exemplary method of using the remote command execution system.

FIG. 3 is a flowchart illustrating an exemplary method of using remote command execution system 26. The method begins at step 100 and proceeds immediately to step 102 where a user initiates a web browser program at a client computer after interconnecting to the Internet server of an Internet service provider. The web browser program may include NETSCAPE NAVIGATOR, MICROSOFT, EXPLORER or any available web browser that is forms-capable and script-enabled. The client computer may be any computer system, although it is preferably a personal computer. For example, a user boots up a personal computer using the WINDOWS 95 operating system and connects to the Internet server of a service provider. The user then selects the NETSCAPE NAVIGATOR icon to execute the web browser at the client.

Proceeding next to step 104, the user enters a unique address or URL that identifies a remote command execution web page. The remote command execution web page is stored on a remote Internet server, such as remote Internet server 15 as shown in FIG. 2. The method proceeds next to step 106 where the remote Internet server receives the request and provides the remote command execution web page to the client along with any embedded script. The web page will generally be stored in HTML format and provided to the client in this format. Furthermore, the embedded script, included in the HTML code of the remote command execution web page, will generally be provided in JAVASCRIPT format. The web browser, executing on a client, receives the HTML code of the remote command execution web page and generates the web page at the display of the client. The embedded script is provided to the web browser and interpreted accordingly. The embedded script may include logon script 41.

At step 108, the remote command execution web page prompts the user to enter a logon ID, a password, and an operating system command to be executed at the remote Internet server. After entering all of these inputs, the user may select the execute icon provided on the remote command execution web page to initiate the remote command execution program. The remote command execution program is preferably stored on the remote Internet server that provided the remote command execution web page. Before the remote command execution program is initiated, at step 110, the web browser, using logon script 41, checks the logon ID and the password inputs to ensure that the user entered something into these inputs. The logon script, previously provided by the remote command execution web page, is interpreted by the web browser and the logon ID and password input fields are checked to ensure that they are not empty. Proceeding next to decision step 112, if the logon ID input or the password input is empty, the web browser, as controlled by logon script 41, proceeds to step 113 where a message is displayed at the client indicating that a logon ID and password must be entered. If the logon ID and password input fields are not empty, the method proceeds next to step 114.

Step 114 involves sending the logon ID, password, and operating system command inputs to the remote Internet server. The URL of the remote command execution web page of the remote Internet server is already known to the web browser because it was previously entered by the user when retrieving the remote command execution web page.

At step 116, remote command execution program 40 then processes the inputs and executes the operating system command as provided by the user in the operating system command input. The method proceeds next to step 118 where the web browser displays the output generated as a result of the remote server executing the operating system command. Specifically, after executing the remote server operating system command, remote command execution program 40 provides an output display generated as a result of executing the operating system command to the web browser at the client in HTML format. An example of this output is shown in FIG. 5.

If the text of the output generated as a result of executing the operating system command at remote Internet server 15 exceeds the screen capability of the web browser, the output can be scrolled at the web browser using up/down and left/right scroll bars as needed for viewing. Although the method has been illustrated in FIG. 3 as the execution of an operating system command, it should be understood that the present invention is in no way limited to the execution of operating system commands but in fact includes the execution of any command at the remote Internet server including commands to execute non-operating system programs.

At decision step 120 it is determined whether another command has been entered at the web browser and, if so, it is executed at the remote Internet server. If another command is entered and the execute button is selected, decision step 120 proceeds to step 108. Otherwise, the method proceeds to step 128 where the method ends.

Figure 4:
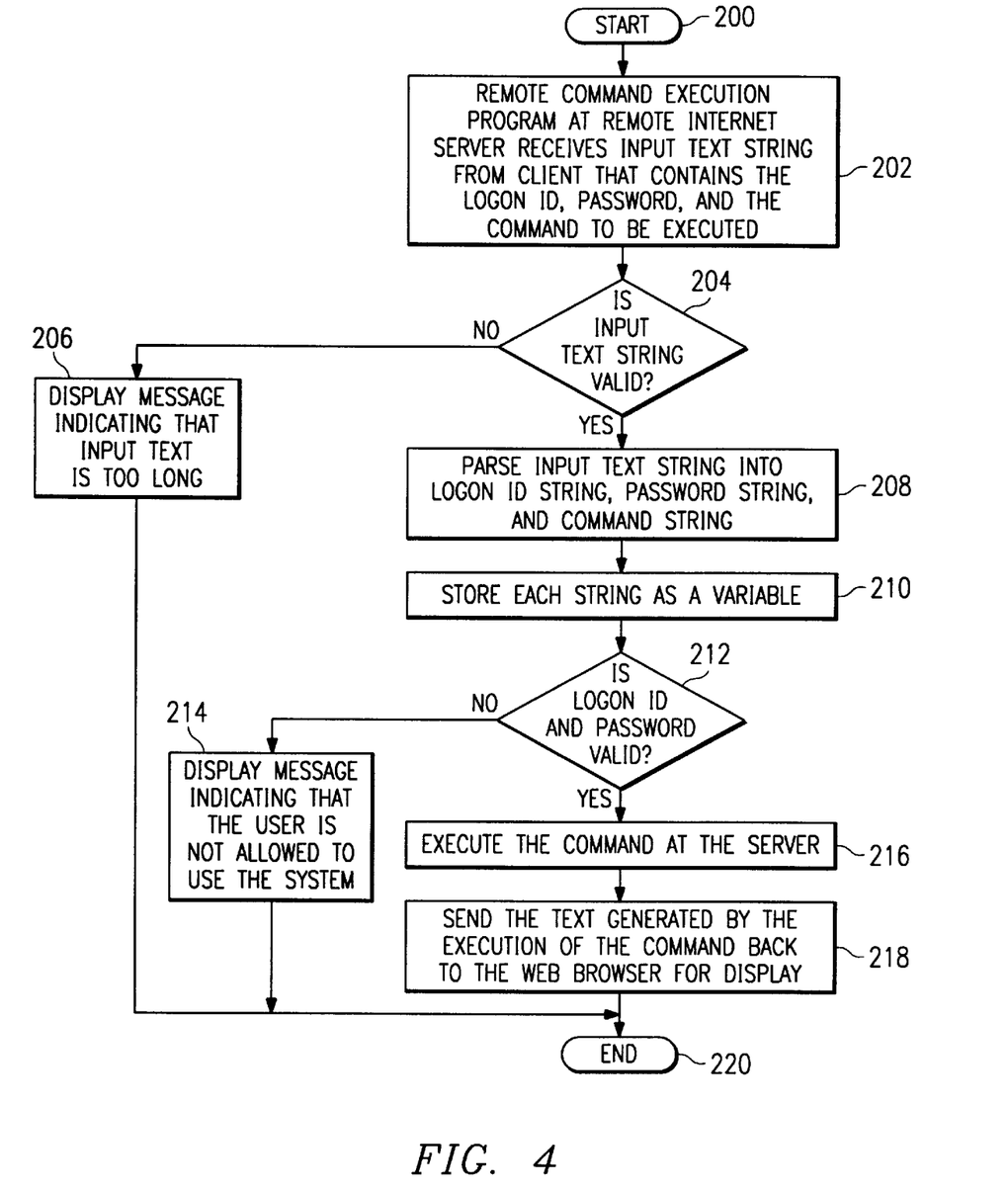
FIG. 4 is a flowchart illustrating an exemplary method of processing by a remote command execution program in response to receiving a request from the client.

FIG. 4 is a flowchart illustrating an exemplary method of processing by remote command execution program 40 in response to receiving a request from client 12. FIG. 4 expands upon the processing functions performed by the remote Internet server as discussed in connection with FIG. 3. The method begins at step 200 and proceeds to step 202 where the remote Internet server receives an input text string from the client. The input text string contains the logon ID, password, and the command inputs. The command is any command, such as an operating system command, to be executed at the server. The method proceeds next to decision step 204.

Decision step 204 involves comparing the length of the input text string to determine whether or not the input text string is too long and thus invalid. The length of input text string is compared to a predetermined value and if the length of the input text string exceeds this predetermined value, the method proceeds to step 206. Step 206 sends a message to the client in web browser format indicating that the input text string is too long and that the inputs are therefore invalid. Otherwise, the method proceeds to step 208 where the input text string is parsed into its various input components: a logon ID string, a password string, and a command string. The method then proceeds to step 210 where each of these input strings are preferably respectively stored as variables.

The method proceeds next to decision step 212 where the logon ID variable and the password variable are analyzed to determine whether they are valid inputs. The logon ID variable and the password variable may be compared to a file of valid logon IDs and passwords. Alternatively, the logon ID variable and the password variable may be compared to another variable to determine if valid. If the logon ID and password are found to be invalid, the method proceeds to step 214 where the server provides a message to the web browser at the client indicating that the user is not authorized to use this system. Otherwise, the method proceeds to step 216.

Step 216 involves executing the command at the server. The command may be an operating system command or any instruction issued by a user that would cause the server to carry out a certain action such as executing a computer program. The method proceeds next to step 218 where the results of executing the command at the server are provided to the web browser in HTML format. The web browser displays the results of executing the command as illustrated in FIG. 5. The method of FIG. 4 ends at step 220. The method illustrated in FIG. 4 is preferably performed using remote command execution program 40 operating on remote Internet server 15. Remote command execution program 40 may be implemented using a common gateway interface ("CGI") program, called a script, that receives inputs from web browser 32 of client 12, processes the inputs and executes other server programs as necessary, and provides any results to web browser 32 in HTML format. Appendix A provides an example of one such implementation of remote command execution program 40 after the example implementation of the command input that is initially provided from remote Internet server 15 to web browser 32 and includes logon script 41. Web browser 32 in turn may display the results of remote command execution program 40.

The present invention may be implemented using any of a variety of computer languages and using any of a variety of computer hardware operating under any of a variety of operating systems. For example, remote Internet server 15 may be a work station operating under the UNIX operating system. The UNIX operating system supports shell scripts, such as Korn shells, that may be used to provide various programming features and to provide HTML information to a web browser. Korn shells function as CGI scripts and may also be used to call other routines such as C programs that may be used in the present invention for such things as the parsing functions performed in step 208 of FIG. 4. The Korn shell serves as a CGI program and provides HTML formatted information to web browser 32 so that the output of remote command execution program 40 may be displayed as a web page.

Figure 5:
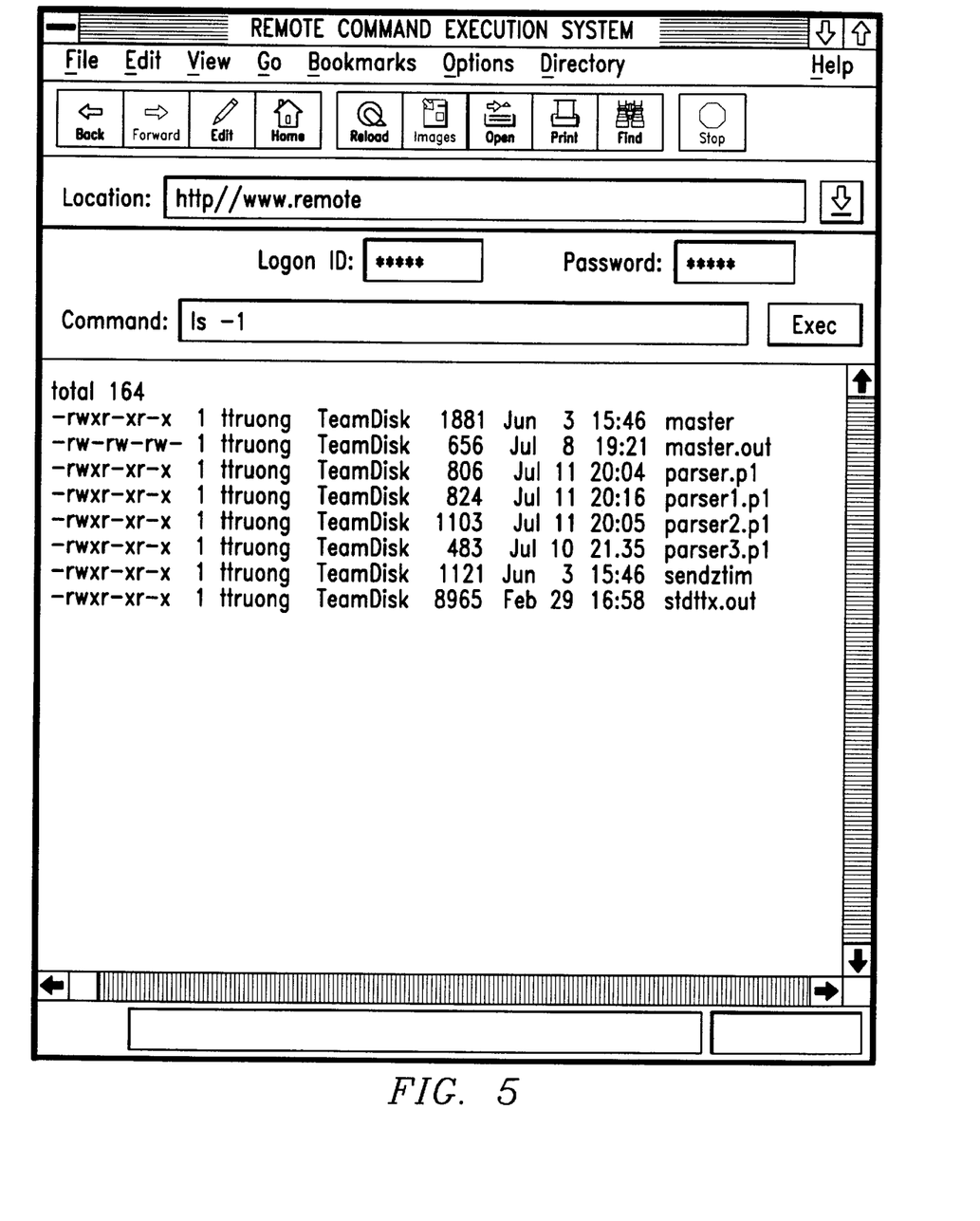
FIG. 5 is an exemplary output display of a web browser illustrating an output provided from the remote command execution system as a web page.

FIG. 5 is an exemplary output display of web browser 32 illustrating an output provided from remote command execution system 26 as a remote command execution web page. The user, using web browser 32, enters the URL in the Location field of the remote command execution web page. The user then selects the enter key and the remote command execution web page is retrieved as shown in FIG. 5. The user may then enter a logon ID, password, and a command in the entry fields as shown. The "Exec" button is then selected which initiates some local processing at client 12 as described in step 110 of FIG. 3 and then provides the logon ID, password, and command inputs to remote Internet server 15 for further processing. If the logon ID and password inputs are valid, remote Internet server 15 executes the command and provides the results in the window as shown. FIG. 5 illustrates the execution of an operating system command to list the contents of a directory. The output window, as shown in FIG. 5, allows text to be scrolled up/down and left/right using the provided arrows.

Thus, it is apparent that there has been provided, in accordance with the present invention, a remote command execution system that allows a system administrator to remotely execute server commands that satisfy the advantages set forth above. Although the preferred embodiment has been described in detail, it should be understood that various changes, substitutions, and alterations can be made herein. For example, the present invention may be implemented on any computer, computer network, or interconnection of computers. Also, the direct interconnections illustrated herein could be altered by one skilled in the art such that two computers or devices are merely coupled to one another through an intermediate computer or device without being directly connected while still achieving the desired results demonstrated by the present invention. Although the present invention has been primarily described and shown as implemented on the Internet, it should be understood that the present invention is not limited to the Internet. Other examples of changes, substitutions, and alterations are readily ascertainable by one skilled in the art and could be made without departing from the spirit and scope of the present invention.

APPENDIX A

```
<HTML>
<HEAD>
<TITLE>Remote Command Execution System</title>
<BASE HREF="http://www.sets">
<META NAME="AUTHOR" CONTENT="tim truong">
<script language="livescript">
<!--------------to hide script contents from old browsers
function runpl(form,button)
    {
    if (form.textid.value.length == 0)
        {
        alert("A Logon ID and Password must be entered.");
        form.action = "file:///tux.htm";
        }
    }
// end hiding contents from old browsers -------------->
</script>
</HEAD>
<BODY background=". ./papers/chalk.xxx">
<form method="post" action="/PRC-cgi-bin/tux">
<center>
<table border=0>
    <tr>
        <td align=center>
            Logon ID: <input type="text" name="textid" size=8>
                Password: <input type="password" name="textpsw" size=10>
            <hr>
        </td>
    </tr>
    <tr>
        <td align=center>
            Command: <input type="text" name="command" size=80>
                <input type="submit" name="exec" value=" EXEC " onclick="runpl(this.form, this.button)">
        </td>
    </tr>
</table>
<br>
<textarea name="text" rows=24 cols=80<></textarea>
</form>
<P align=center>
<FONT size=-1>
</FONT>
</BODY>
</HTML>
#---------------------------------------------

# author: Timothy M. Truong

#---------------------------------------------
echo 'Content-type: text/html\n\n'
echo ''
echo ''
echo '<html>'
echo '<head>'
echo ''
echo "<TITLE>Remote Command Execution System</title>"
echo '<base href="http://www.sets">'
echo '<meta name="author" content="tim truong">'
#echo '<script language=livescript">
#echo '<!---- to hide from old browsers - - - -'
#echo '// end hiding -->'
#echo '</script>'
echo '</head>'
echo '<body background=". ./paper/chalk.xxx">'
#-----------determine method-----------
if [  $REQUEST_METHOD = "GET"   ]; then
    BUFF=$QUERY>STRING
else
    LENGTH=$CONTENT_LENGTH
    if [  $LENGTH -gt '32000']; then
        echo '<hr>'
        echo '<h3> Sorry, the text string of your command is too long</h3>'
```

APPENDIX A-continued

```
            echo '<hr>'
            echo '</body>'
            echo '</html>'
            exit
    fi
    read BUFF
fi
#-----------parse input-----------
echo $BUFF |
        /proj/wildfire/parser1.pl |
while read line
do
    field_name=`echo $line | cut -f1 -d=
    field_value=e,gra echo $line | cut -f2 -d=
    case $field_name in
        textid)
            Id="$field_value"
            ;;
        textpsw)
            Passw="$field_value"
            ;;
        command)
            Cmd="$field_value"
            XCmd=$Cmd
            ;;
    esac
done
#-------------check security-----------
if [" $Id" != 'xxx' ] || [ "$Passw" != 'xxx' ]; then
        echo '<hr>'
        echo '<h3> Sorry, you are not authorized to use this
system.'
        echo '<hr>
        echo '</body>'
        echo '</html>'
        exit
fi
#-------------send stuff to browser-----------
echo '<form method="post" action="/PRC-cgi-bin/tux">'
echo '<center>'
echo '<table border=0>'
echo '<tr>'
echo '<td align=center>'
echo    'Logon  ID:  <input  type=text  name=textid
value=""""$Id"""" size=8>'
echo 'Password: <input type=password name=textpsw
value=""""$Passw"""" size=10>'
echo '<hr>'
echo '</td>'
echo '</tr>'
echo '<tr>'
echo '<td align=center>'
echo    'Command:     <input     type=text     name=command
value=""""$Cmd"""" size=80>'
echo '<input type="submit" name="exec" value="EXEC">'
echo '</td>'
echo '</tr>'
echo '</table>'
echo '<pre>'
echo '<textarea rows=24 cols=80>'
$XCmd
echo '</textarea>'
echo '</pre>'
echo '</form>'
echo '</body>'
echo '</html>'
#---------------------------------------------

# author: Timothy M. Truong

#---------------------------------------------
$formData = <STDIN>;
chop($formData);
#-----------parse input-----------
foreach (split(/&/, $formData ))
    {
        ($fieldName, $fieldValue) = split(/=/,$_);
        $fieldName =~ s/\+//g;
        $fieldName =~ s/%([0-9|A-F]{2})/pack(C,hex($1))/eg;
```

APPENDIX A-continued

```
        $fieldValue =~ s/\+//g;
        $fieldValue =~ s/% (0[AD])//eg;
        $fieldValue =~ s/%([0-9|A-F]{2})/pack(C,hex($1))/eg;
        $myData{$fieldName} = $fieldValue;
    }
#-----------assign values-----------
foreach $term (keys(%myData))
    {
        print ($term, "=",$myData{$term}, "\n");
    }
```

What is claimed is:

1. A remote command execution system using a client coupled to a server over a network comprising:
   a client operable to run a parser program
   a server coupled to the client and running a particular operating system, the server operable to:
   receive a request for a command input form from the client;
   communicate the command input form to the client, the client operable to enter an input text string in the command input form, the input string including a operating system command for the particular operating system and a security access code;
   receive the input text string from the client;
   parse the input text string and store the operating system command and security access code as variables;
   execute the operating system command;
   generate an output form, the output form including output generated in response to executing the operating system command; and,
   communicate the output form to the client.

2. The remote command execution system of claim 1, wherein the command input form and output form are provided in a format understandable by the parser program.

3. The remote command execution system of claim 1, wherein the parser program is not a terminal emulation program operable to emulate a server terminal and to directly couple the client to the server using a direct-dial telecommunication link.

4. The remote command execution system of claim 2, wherein the parser program is a web browser.

5. The remote command execution system of claim 4, wherein the command input form includes a first part communicated to the web browser of the client in hypertext markup language format and a second part communicated to the web browser of the client in a scripting language format, and the output form is generated and communicated to the web browser of the client in hypertext markup language format.

6. The remote command execution system of claim 5, wherein the first part of the command input form is used by the web browser of the client to generate a display that provides input fields to receive the operating system command and the security access code.

7. The remote command execution system of claim 6, wherein the second part of the command input form is provided in a JAVASCRIPT format and enables the web browser to verify that a security access code has been entered.

8. The remote command execution system of claim 5, wherein the first part of the command input form further includes a list of available operating system commands.

9. The remote command execution system of claim 1, wherein the web browser is forms-capable and script-enabled.

10. The remote command execution system of claim 7, wherein the security access code includes a password.

11. The remote command execution system of claim 7, wherein the security access code includes a logon identification.

12. The remote command execution system of claim 1, wherein the server is responsive to store the security access code as a variable and to compare the security access code to at least one predefined value.

13. The remote command execution system of claim 12, wherein the server is further responsive to communicate a text message to the client if the security access code is not equivalent to one of the at least one predefined value.

14. A remote command execution system using a server and a client in communication through a network, the system comprising:

a client using a forms-capable web browser, the client operable to exchange information through a network; and the server running a particular operating system and operable to communicate a command input form to the client in response to receiving a request from the client, receive and store an input text string from the client that includes an operating system command of the particular operating system to be executed at the server and a security access code, to process the input text string and store the operating system command and security access code as variables, to execute the operating system command and generate an output form in response, and communicate the output form to the client for display.

15. The remote command execution system of claim 14, wherein the server and the client are in communication through the Internet.

16. A method for remotely executing a command of a network server, comprising the steps of:

communicating a command input form from a server to a client through a network in response to receiving a request from the client, the client using a web browser;

entering an input text string in the command input form at the client the input including an operating system command of the server's operating system and a security access code;

storing the security access code input as a variable;

executing the operating system command at the server and generating an output form in response; and communicating the output form to the web browser of the client for display at the client.

17. The method of claim 16, further comprising the steps of:

comparing the security access code to a predefined value; and generating a message if the security access code is not equivalent to the predefined value.

* * * * *